Oct. 6, 1942.                A. LUISADA                2,297,905
         APPARATUS FOR AND METHOD OF REGISTERING
              OR RECORDING ARTERIAL PULSE WAVES
                     Filed Sept. 17, 1940
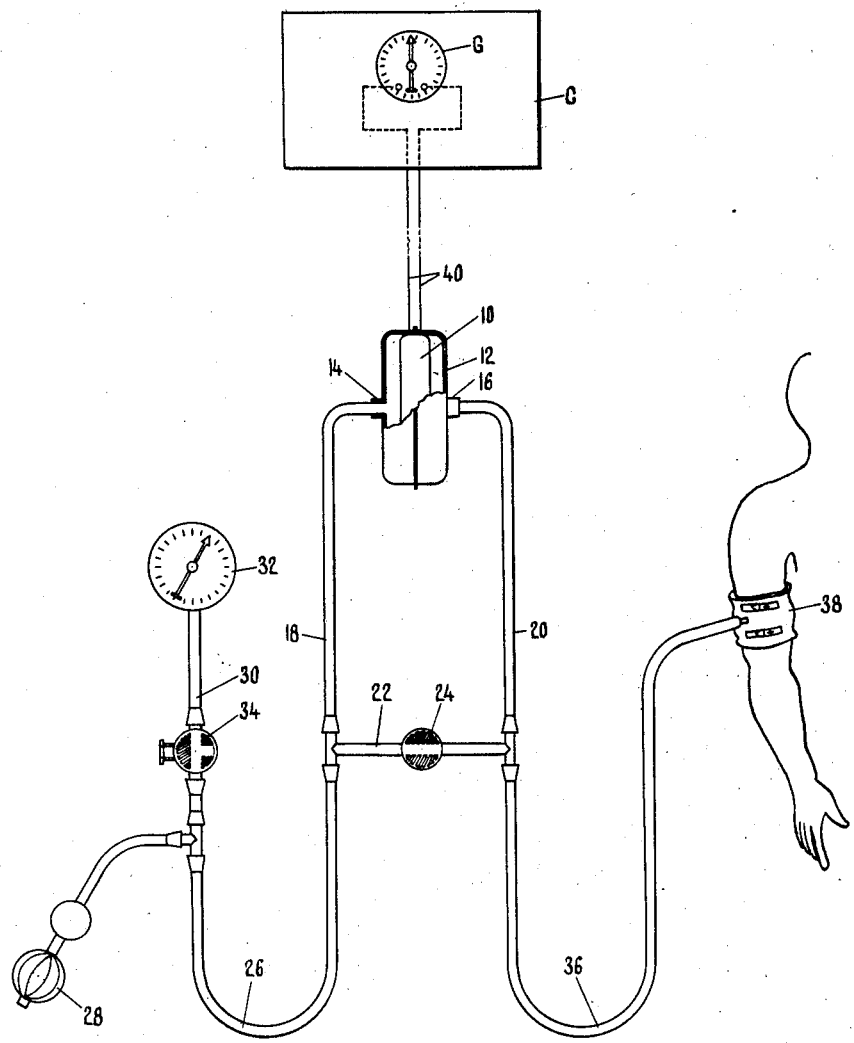
Inventor
ALDO LUISADA.
By Edwin Lensink
Attorney Patented Oct. 6, 1942

2,297,905

UNITED STATES PATENT OFFICE 2,297,905

APPARATUS FOR AND METHOD OF REGISTERING OR RECORDING ARTERIAL PULSE WAVES

Aldo Luisada, Cambridge, Mass.

Application September 17, 1940, Serial No. 357,092

7 Claims. (Cl. 128—2.05)

This invention relates to an apparatus for and a method of registering or recording the arterial pulse and more particularly to an apparatus for and a method of registering or recording arterial pulse waves.

The main object of the present invention is the provision of apparatus adapted to be associated with an electric cardiograph for registering or recording arterial pulse waves by translating the pressure pulses of the artery into electric pulses and operating an electric register or recorder by said electric pulses. More specifically, in accordance with the present invention, the pressure pulses of the arterial pulse are applied to a piezo electric microphone which converts the pressure or mechanical pulses to electrical pulses for transmission to an electrically operated register or recorder of any suitable electric cardiograph for registering or recording the usual heart waves.

The main object of the invention and objects ancillary thereto will be more fully understood from the following description considered in connection with the accompanying illustrative drawing.

In the drawing, the figure is a view illustrating more or less diagrammatically the apparatus and method of the present invention.

Referring now to the drawing in detail, the apparatus comprises a piezo electric microphone 10 disposed within a casing 12. Said casing is provided with inlets 14 and 16 at opposite sides, respectively, of the piezo electric microphone 10. Air or other suitable fluid is admitted to casing 12 through inlets 14 and 16 for applying pressure to both sides of the piezo electric microphone 10. The piezoelectric microphone can be of any suitable type and as it is well known further description thereof is unnecessary. By applying fluid pressure to both sides of the piezoelectric crystal I am able to subject the piezoelectric crystal to high pressures and at the same time it is possible to utilize a sensitive crystal. It will be understood that in taking the arterial pulse it is necessary to employ high pressures in order to obtain variations capable of being measured. Also, it will be understood that for registering or recording the blood pressure it is necessary to subject the artery to a high pressure. Since it is desirable to utilize a sensitive crystal this can be accomplished in accordance with the present invention in view of the application to the crystal of pressure to both sides thereof.

Tubes 18 and 20 are connected to inlets 14 and 16, respectively, and to a fitting 22 provided with a valve 24. Tube 18 is also connected by means of tube 26 or in any other suitable way to an air pump or other pressure source here shown as a hand pump or air bulb 28 to which is also connected by means of a tube 30 a manometer or other suitable pressure gauge 32. Tube 30 is provided with a valve 34. Tube 20 which is connected to inlet 16 at one side of the piezoelectric device is also connected by means of a tube 36 or in any other suitable way to arterial pulse responsive means here shown as a cuff 38. Thus both sides of the piezoelectric microphone 10 can be subjected to pressure admitted through tubes 18 and 20, respectively.

The electric cardiograph is indicated more or less diagrammatically at C and includes a galvanometer or other suitable registering or recording instrument G which is electrically connected to the piezoelectric device 10 by wires 40 which transmit electric pulses from the piezoelectric device to said galvanometer.

In utilizing the apparatus in accordance with the method of the present invention for registering or recording the arterial pulse, the systolic blood pressure is first ascertained in any known manner and afterwards the cuff 38 is applied to the arm as illustrated, or it can be applied to the forearm, thigh or leg, as may be desired. When the cuff is applied, valve 24 is first positioned to establish communication between the opposite sides of the piezoelectric microphone, and air is pumped into the system until the desired balanced static pressure, usually two-thirds of the previously ascertained systolic pressure, is attained as indicated by gauge 32. When air of this pressure has been applied to both sides of the piezoelectric microphone and the gauge reading is stable, valve 24 is closed thereby to interrupt communication between the opposite sides of the microphone and between the cuff and the source of air pressure. When valve 24 is closed the oscillating changes of pressure of the arterial pulses are transmitted through tubes 36 and 20 to one side only of the piezoelectric microphone and are converted by the latter into electric pulses which are transmitted through wires 40 to the cardiograph C for registering or recording the arterial pulse waves. It will be understood that any suitable electrically operated device for recording the pulse waves can be utilized in the present apparatus and in accordance with the present method, by subjecting said recording device to the action of the electric pulses to which the pressure pulses of the arterial pulse are converted by the piezoelectric microphone 10.

The apparatus can be utilized not only for recording arterial pulse waves but for other purposes such as, for example, recording blood pressure, as an oscillometer and oscillograph for measuring the blood pressure and the pulse amplitude in different peripheral arteries, and for studying the arterial sounds by comparing pulse changes and sound changes of the brachial artery, etc. For obtaining a record of the blood pressure a double cuff and a microphone are applied to the arm. The upper cuff is used only for producing a compression on the artery and the lower cuff is used as a pulse detector, the microphone being used as a sound detector. The upper cuff is connected to the air pump through a valve connection whereby the upper cuff is excluded during registration so that no pulsation which might otherwise be derived from the upper cuff can be seen on the record. In utilizing the device as an oscillometer and oscillograph a single cuff is applied to the limb, the study of which is required, that is, to the arm, forearm, thigh, leg, ankle, as the case may be, and the apparatus is operated as described above for obtaining a record of the arterial pulse waves. For using the device in the study of the arterial sounds, a microphone is applied on the brachial artery at the level of the elbow and at the same time the cuff is applied to the arm and the apparatus operated for registering the pulse waves, thereby to compare the pulse changes and sound changes.

While I have shown and described the preferred manner of practicing the present invention, it will be understood that the latter is susceptible of variations as to details of construction of the apparatus and of the method of utilizing the apparatus for the various purposes hereinbefore indicated. Accordingly, I do not wish to be limited to the apparatus or method as herein specifically illustrated or described except to the extent which may be required by the scope of the present claims. For convenience of expression, the term "indicating" as used in the claims denotes either registering or recording, as the device indicated diagrammatically at G can be a register or recorder.

Having thus described my invention, what I claim and desire to secure by Letters Patent is:

1. Apparatus of the character described comprising a piezo electric microphone, means for applying balanced static fluid pressure to both sides of the piezo electric crystal of said microphone, and arterial pulse-responsive fluid-pressure means connected to one side only of said microphone for transmitting to said one side of said microphone crystal variations in fluid pressure corresponding to pulse pressure variations.

2. Apparatus of the character described comprising a piezo electric microphone, means for applying balanced static fluid pressure to both sides of the piezo electric crystal of said microphone, arterial pulse-responsive fluid-pressure means connected to one side only of said microphone for transmitting to said one side of said microphone crystal variations in fluid pressure corresponding to pulse pressure variations, and an electric indicator connected to said microphone and operated by the electric pulses generated thereby in response to said pressure variations thereon.

3. Apparatus of the character described comprising piezo electric crystal microphone, arterial pulse-responsive fluid-pressure means connected to one side of said microphone for subjecting the crystal thereof to fluid-pressure variations, a source of fluid pressure, means for connecting said source to both sides of said microphone for transmitting fluid pressure to both sides of the crystal thereof and to said pulse-responsive means, and means for interrupting the communication between said pulse-responsive means and said source and between the latter and said one side of the microphone.

4. Apparatus of the character described comprising a piezo electric crystal microphone, arterial pulse-responsive fluid-pressure means connected to one side of said microphone for subjecting the crystal thereof to fluid-pressure variations, a source of fluid pressure, means for connecting said source to both sides of said microphone for transmitting fluid pressure to both sides of the crystal thereof and to said pulse-responsive means, means for interrupting the communication between said pulse-responsive means and said source and between the latter and said one side of the microphone, and an electric indicator connected to said microphone and operated by the electric pulses generated thereby.

5. The method of indicating arterial pulse waves which comprises applying fluid-pressure pulse-responsive means to a limb, admitting fluid pressure to said means and simultaneously applying said fluid pressure to both sides of the crystal of a piezo electric microphone, and then subjecting one side only of said microphone crystal to the crystal-deformation action of the pressure variations of the pulse by transmitting said pressure variations from said means to one side only of said microphone while the other side thereof is acted on by said first mentioned fluid pressure.

6. The method of indicating arterial pulse waves which comprises applying fluid pressure pulse-responsive means to a limb, admitting fluid pressure to said means and simultaneously applying said fluid pressure to both sides of the crystal of a piezo electric microphone, and then subjecting one side only of said microphone crystal to the crystal-deformation action of the pressure variations of the pulse by transmitting said pressure variations from said means to one side only of said microphone while the other side thereof is acted on by said first mentioned pressure, and transmitting to an electrically operated indicator the electric pulses generated by said microphone in response to the crystal-deformations carried by the pressure variations transmitted to the crystal from said pulse-responsive means.

7. Apparatus of the character described comprising a casing having opposed walls, each of said walls having a fluid-pressure inlet, a piezo-electric crystal microphone mounted in said casing in position to be subjected at its opposite sides to fluid pressure admitted through said inlets, respectively, arterial pulse-response fluid-pressure means communicating with said casing through one of said inlets for subjecting the crystal of said microphone to fluid-pressure variations of said pulse-response means, a source of fluid pressure connected to both of said inlets and to said pulse-response means for applying fluid pressure to both sides of the microphone crystal, means for interrupting the supply of fluid pressure from said source to said one of the inlets and to said pulse-response means, and indicating means connected to said microphone and operated by the electrical pulses generated by the deformations of the microphone crystal in response to said fluid-pressure variations thereon.

ALDO LUISADA.